United States Patent
Bataller et al.

(10) Patent No.: US 10,762,127 B2
(45) Date of Patent: Sep. 1, 2020

(54) FACE RECOGNITION IMAGE DATA CACHE

(71) Applicant: Accenture Global Services Limited, Dublin (IE)

(72) Inventors: Cyrille Bataller, Mougins (FR); Anders Astrom, Singapore (SG); Vitalie Schiopu, Bertrange (LU); Hakim Khalafi, Amsterdam (NL)

(73) Assignee: Accenture Global Services Limited, Dublin (IE)

( * ) Notice: Subject to any disclaimer, the term of this patent is extended or adjusted under 35 U.S.C. 154(b) by 88 days.

(21) Appl. No.: 16/185,186

(22) Filed: Nov. 9, 2018

(65) Prior Publication Data

US 2019/0129904 A1   May 2, 2019

Related U.S. Application Data

(63) Continuation of application No. 14/993,803, filed on Jan. 12, 2016, now Pat. No. 10,146,797.

(Continued)

(51) Int. Cl.
*G06K 9/00* (2006.01)
*G06F 16/583* (2019.01)
(Continued)

(52) U.S. Cl.
CPC .......... *G06F 16/5838* (2019.01); *G06F 16/53* (2019.01); *G06F 16/538* (2019.01);
(Continued)

(58) Field of Classification Search
CPC ............. G06K 9/00288; G06K 9/6215; G06K 2209/21; G06K 9/00295;
(Continued)

(56) References Cited

U.S. PATENT DOCUMENTS 5,386,103 A   1/1995   DeBan et al.
6,111,517 A   8/2000   Atick et al.
(Continued)

FOREIGN PATENT DOCUMENTS

EP   0786735   7/1997
EP   1600882   11/2005

OTHER PUBLICATIONS

EP Search Report in Application No. 13000443.5 dated Jul. 31, 2014, 6 pages.

(Continued)

*Primary Examiner* — Guillermo M Rivera-Martinez
(74) *Attorney, Agent, or Firm* — Fish & Richardson P.C.

(57) ABSTRACT

Methods, systems, and apparatus, including computer programs encoded on computer storage media, for storing facial recognition image data in a cache. One of the methods includes receiving an image from a camera, detecting, in the received image, a face of a person, searching a biometric data cache based on the detected face, in response to searching the biometric data cache based on the detected face, determining whether the biometric data cache includes data for the person, in response to a determination that the biometric data cache includes data for the person, using the data from the biometric data cache to determine an identifier for the person, and in response to a determination that the biometric data cache does not include data for the person: searching a data storage system based on the detected face of the person to determine whether the data storage system includes data for the person.

18 Claims, 4 Drawing Sheets

Related U.S. Application Data

(60) Provisional application No. 62/246,746, filed on Oct. 27, 2015, provisional application No. 62/167,930, filed on May 29, 2015.

(51) Int. Cl.
  *G06K 9/62* (2006.01)
  *G06F 16/538* (2019.01)
  *G06F 16/53* (2019.01)

(52) U.S. Cl.
  CPC ....... *G06F 16/583* (2019.01); *G06K 9/00288* (2013.01); *G06K 9/6228* (2013.01)

(58) Field of Classification Search
  CPC . G06T 2207/30196; G06T 7/292; G06T 7/00; G06T 7/55; G06T 7/62; G06Q 20/40145
  See application file for complete search history.

(56) References Cited

U.S. PATENT DOCUMENTS

| | | | |
|---|---|---|---|
| 6,496,595 B1 | 12/2002 | Puchek et al. | |
| 8,254,633 B1* | 8/2012 | Moon | G06K 9/00771 382/103 |
| 8,948,465 B2 | 2/2015 | Tiwari et al. | |
| 8,948,652 B2 | 2/2015 | Tiwari et al. | |
| 9,020,207 B2 | 4/2015 | Paul et al. | |
| 9,195,893 B2 | 11/2015 | Tiwari et al. | |
| 9,230,157 B2 | 1/2016 | Bataller et al. | |
| 9,483,689 B2 | 1/2016 | Tiwari et al. | |
| 9,262,675 B2 | 2/2016 | Wabgaonkar et al. | |
| 9,268,904 B1* | 2/2016 | Harding | G06F 16/284 |
| 9,292,749 B2 | 3/2016 | Tiwari et al. | |
| 9,390,338 B2 | 7/2016 | Tiwari et al. | |
| 9,582,723 B2 | 2/2017 | Tiwari et al. | |
| 9,773,157 B2 | 9/2017 | Bataller et al. | |
| 2003/0184468 A1 | 10/2003 | Chen et al. | |
| 2004/0117638 A1* | 6/2004 | Monroe | G08B 13/19682 713/186 |
| 2004/0143602 A1* | 7/2004 | Ruiz | G08B 13/122 |
| 2004/0153649 A1 | 8/2004 | Rhoads et al. | |
| 2004/0213437 A1* | 10/2004 | Howard | B42D 25/305 382/115 |
| 2004/0240711 A1 | 12/2004 | Hamza et al. | |
| 2005/0039053 A1* | 2/2005 | Walia | G06F 21/316 726/4 |
| 2005/0063566 A1 | 3/2005 | Beek et al. | |
| 2005/0207622 A1* | 9/2005 | Haupt | H04N 21/44008 382/118 |
| 2005/0265603 A1 | 12/2005 | Porter et al. | |
| 2006/0093190 A1 | 5/2006 | Cheng et al. | |
| 2006/0104484 A1 | 5/2006 | Bolle et al. | |
| 2006/0104487 A1 | 5/2006 | Porter et al. | |
| 2007/0047775 A1 | 3/2007 | Okubo | |
| 2007/0269082 A1 | 11/2007 | Matsuyama | |
| 2008/0310686 A1* | 12/2008 | Kretz | G06K 9/00255 382/118 |
| 2010/0157040 A1* | 6/2010 | Ofir | G06K 9/00275 348/77 |
| 2010/0157128 A1 | 6/2010 | Choi et al. | |
| 2010/0295944 A1* | 11/2010 | Takeuchi | G06K 9/00771 348/143 |
| 2010/0329568 A1* | 12/2010 | Gamliel | G06K 9/00241 382/190 |
| 2011/0074950 A1 | 3/2011 | Oka et al. | |
| 2011/0106734 A1 | 5/2011 | Boult et al. | |
| 2011/0138191 A1 | 6/2011 | Bond | |
| 2011/0228094 A1 | 9/2011 | Cheng et al. | |
| 2012/0095958 A1* | 4/2012 | Pereira | G06F 16/48 707/609 |
| 2012/0179742 A1* | 7/2012 | Acharya | H04N 7/18 709/202 |
| 2012/0314911 A1 | 12/2012 | Paul et al. | |
| 2013/0155229 A1* | 6/2013 | Thornton | H04N 7/18 348/143 |
| 2013/0195316 A1* | 8/2013 | Bataller | G06K 9/00255 382/103 |
| 2013/0259381 A1 | 10/2013 | Srinivasan | |
| 2013/0265450 A1* | 10/2013 | Barnes, Jr. | H04N 5/77 348/207.1 |
| 2013/0266193 A1 | 10/2013 | Tiwari et al. | |
| 2014/0237587 A1 | 8/2014 | Forbes | |
| 2014/0305352 A1 | 10/2014 | Dowling | |
| 2014/0310786 A1 | 10/2014 | Harding | |
| 2014/0365506 A1* | 12/2014 | Gong | G06K 9/00771 707/748 |
| 2015/0098632 A1* | 4/2015 | Monta | G06K 9/00295 382/118 |
| 2015/0117786 A1* | 4/2015 | James | G06K 9/00221 382/195 |
| 2015/0161460 A1 | 6/2015 | Tiwari et al. | |
| 2015/0178569 A1 | 6/2015 | Tiwari et al. | |
| 2015/0294159 A1* | 10/2015 | Takahashi | G08B 13/19645 382/103 |
| 2015/0379330 A1 | 12/2015 | Srinivasan | |
| 2016/0155007 A1 | 6/2016 | Tiwari et al. | |
| 2016/0224824 A1* | 8/2016 | Yamada | G06K 9/00234 |
| 2016/0283782 A1 | 9/2016 | Tiwari et al. | |
| 2016/0350334 A1 | 12/2016 | Tiwari et al. | |
| 2016/0350587 A1* | 12/2016 | Bataller | G06T 7/80 |
| 2017/0032204 A1 | 2/2017 | Tiwari et al. | |
| 2017/0206345 A1 | 7/2017 | Lacous | |
| 2017/0236407 A1 | 8/2017 | Rhoads | |
| 2017/0351906 A1* | 12/2017 | Oguchi | G06K 9/00255 |

OTHER PUBLICATIONS

European Office Action in Application No. 13162720.2—1901 dated Apr. 23, 2014, 9 pages.
European Search Report for Application No. 13162720.0—1901 dated Aug. 13, 2013, 3 pages.
Pinto, Examiner in corresponding European Application No. EP12004276.7, "European Search Report", dated Dec. 4, 2012, 5 pages.
U.S. Non-Final Office Action for U.S. Appl. No. 13/409,584 dated Aug. 29, 2014, 21 pages.
U.S. Non-Final Office Action for U.S. Appl. No. 14/585,480 dated Jun. 5, 2015, 21 pages.
U.S. Notice of Allowance for U.S. Appl. No. 13/409,584 dated Nov. 12, 2014, 12 pages.
U.S. Notice of Allowance for U.S. Appl. No. 13/598,819 dated Sep. 26, 2014, 24 pages.
U.S. Notice of Allowance for U.S. Appl. No. 14/585,480 dated Jul. 31, 2015, 8 pages.
U.S. Notice of Allowance for U.S. Appl. No. 14/882,552 dated Nov. 30, 2015, 25 pages.
Han et al: "A Non-uniform Quantizing Approach to Protect Biometric Templates", Intelligent Information Hiding and Multimedia Signal Processing, 2006. IIH-MSP '06. International Conference on, IEEE, PI, Dec. 1, 2006 (Dec. 1, 2006), pp. 693-698, XP031034150.
Hsieh et al., "Image Enhancement and Image Hiding Based on Linear Image Fusion—Image Fusion," Osamu Ukimura (Ed.), ISBN: 978-953-307-679-9, InTech, Available from: http://www.intechopen.com/books/image-fusion/image-enhancement-and-image-hiding-based-on-linearimage-fusion, Jan. 12, 2011, pp. 23-42.
Knuth, "The Art of Computer Programming", vol. 3, Section 6.2.1 :Searching an Ordered Table, Second Edition, Third Printing. Addison-Wesley, Aug. 1998 ISBN 0-201-89685-0, 20 pages.
Li et al: "Biometrics at a Distance: Issues, Challenges, and Prospects", Jan. 1, 2009 (Jan. 1, 2009), Handbook of Remote Biometrics : Advances in Pattern Recognition; [Advances in Pattern Recognition], Springer, UK, pp. 3-21, XP008163781.
Lovell et al.: "Invited Paper: Embedded Face and Biometric Technologies for National and Border Security", Computer Vision and Pattern Recognition Workshops (CVPRW), 2011 IEEE Computer Society Conference on, IEEE, Jun. 20, 2011 (Jun. 20, 2011), pp. 117-122, XP031926583.

(56) References Cited

OTHER PUBLICATIONS

Lovell et al.: "Parallel Distributed Face Search System for National and Border Security", The 7th U.S./Australia Joint Workshop on Defense Applications of Signal Processing (DASP), Jul. 10, 2011 (Jul. 10, 2011), pp. 117-123, XP055074042.

Monro, et al., "DCT-based Iris Recognition" published in IEEE Transactions on Pattern Analysis and Machine Intelligence, vol. 29, No. 4, Apr. 2007, 10 pages.

Tsalakanidou et al: "A 3D face and hand biometric system for robust user-friendly authentication", Pattern Recognition Letters, Elsevier, Amsterdam, NL, vol. 28, No. 16, Oct. 11, 2007 (Oct. 11, 2007), pp. 2238-2249, XP022293676.

Turk, et al. "Eigenfaces for Recognition", Journal of Cognitive Neuroscience, vol. 3, No. 1, Jan. 1, 1991, pp. 71-86.

U.S. Notice of Allowance for U.S. Appl. No. 15/019,500 dated Apr. 15, 2016, 12 pages.

European Office Action for Application No. 13162720.0, dated Jul. 12, 2016, 6 pages.

U.S. Notice of Allowance for U.S. Appl. No. 14/621,819 dated Jul. 20, 2016, 12 pages.

U.S. Notice of Allowance for U.S. Appl. No. 15/177,714, dated Aug. 31, 2016, 10 pages.

U.S. Non-Final Office Action in U.S. Appl. No. 14/961,294, dated Oct. 3, 2016, 27 pages.

U.S. Notice of Allowance in U.S. Appl. No. 15/294,897, dated Dec. 22, 2016, 19 pages.

Indian Office Action in Indian Application No. 1939/CHE/2011, dated Sep. 13, 2017, 5 pages.

India Office Action for Application No. 1400/CHE/2012, dated Mar. 28, 2018, 7 pages.

U.S. Final Office Action in U.S. Appl. No. 14/933,803, dated Jun. 14, 2018, 78 pages.

U.S. Notice of Allowance in U.S. Appl. No. 14/993,803 dated Sep. 17, 2018, 10 pages.

\* cited by examiner

FACE RECOGNITION IMAGE DATA CACHE

CROSS-REFERENCE TO RELATED APPLICATION

This application is a continuation (and claims the benefit of priority under 35 USC 120) of U.S. application Ser. No. 14/993,803, filed Jan. 12, 2016, which claims the benefit of U.S. Provisional Application Nos. 62/246,746, filed Oct. 27, 2015, and U.S. Provisional Application Nos. 62/167,930, filed May 29, 2015. All of these prior applications are incorporated by reference in their entirety.

BACKGROUND

Some video systems may analyze frames in a video stream to identify objects shown in the video stream. For instance, a video system may determine whether an object is a person and determine whether a face of the person is shown in a frame from the video stream.

SUMMARY

In general, one innovative aspect of the subject matter described in this specification can be embodied in methods that include the actions of receiving an image from a camera, detecting, in the received image, a face of a person, searching a biometric data cache based on the detected face of the person, the biometric data cache configured to maintain, for a first group of multiple different people, image data for each person in the first group, each person in the first group having at least a threshold likelihood of being within a field of view of a camera, in response to searching the biometric data cache based on the detected face, determining whether the biometric data cache includes data for the person, in response to a determination that the biometric data cache includes data for the person, using the data from the biometric data cache to determine an identifier for the person, and in response to a determination that the biometric data cache does not include data for the person: searching a data storage system based on the detected face of the person to determine whether the data storage system includes data for the person, the data storage system configured to maintain, for a second group of multiple different people that is different than the first group, biometric data for each of the multiple different people, and storing image data for the person in the biometric data cache. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include determining, for each person in the second group of multiple different people, a likelihood that the person will be within the field of view of the camera within a threshold amount of time, selecting, for each person in the second group of multiple different people, the person in response to a determination that the likelihood of being located within the field of view of the camera within the threshold amount of time satisfies the threshold likelihood, and maintaining, for each person in the second group of multiple different people, the biometric data cache with image data for the person. The biometric data cache may be for a specific camera. The method may include receiving another image from the camera, detecting, in the other image, a face of the person, determining a second biometric data cache for a second camera, causing a second data processing apparatus to search the second biometric data cache based on the detected face in the other image, receiving a message indicating whether the second biometric data cache includes data for the person, in response to receipt of a message indicates that the second biometric data cache includes data for the person, using the data from the second biometric cache to determine an identifier for the person, and in response to receipt of a message indicates that the second biometric data cache does not include data for the person, searching the data storage system based on the detected face in the other image to determine whether the data storage system includes data for the person. The method may include receiving, from another biometric data cache for each person in a third group of multiple different people, image data for the person, and storing the received image data in the biometric data cache.

In some implementations, receiving the image from the camera may include receiving multiple images, detecting, for each of the multiple images, at least a portion of the face of the person in the image, determining, for each of the multiple images, a quality of the image, and selecting a highest quality image from the multiple images that has a higher quality than the other images in the multiple images. Searching the biometric data cache based on the detected face of the person may include searching the biometric data cache using portion of the detected face from the highest quality image. A system may include the camera. Receiving the multiple images may include receiving each of the multiple images from the camera. The system may include a memory, different from the data storage system and the biometric data cache, to maintain, for each person in the second group, current highest quality image data for the person and a quality descriptor for the current highest quality image data. The method may include determining that the memory does not include an image associated with the person, and in response to determining the memory does not include an image associated with the person, storing, in the memory, image data for the highest quality image as new current highest quality image data.

In some implementations, the method may include in response to the determination that the biometric data cache does not include data for the person, storing, in the biometric data cache, the image data for the highest quality image. The method may include in response to the determination that the biometric data cache includes data for the person, determining whether a quality of the highest quality image is greater than a quality of image data for the person in the biometric data, and in response to a determination that quality of the highest quality image is greater than the quality of image data for the person in the biometric data, storing, in the biometric data cache, the image data for the highest quality image. The method may include determining whether the highest quality image from the multiple images or the current highest quality image for the person has a higher quality, and in response to a determination that the highest quality image from the multiple images has a higher quality than the current highest quality image for the person: storing, in the biometric data cache, image data for the highest quality image, and storing, in the memory, the image data for the highest quality image as new current highest quality image data. Searching the biometric data cache using the portion of the face detected from the highest quality image may include searching the biometric data cache using the portion of the detected face from the highest quality image in response to the determination that the highest quality image from the multiple images has a higher quality than the current highest quality image for the person. The method may include receiving multiple second images, detecting, for each of the multiple second images, at least a portion of the face of the person in the second image, determining, for each of the multiple second images, a quality of the second image, selecting a highest quality second image from the multiple second images that has a higher quality than the other images in the multiple second images, determining that the highest quality second image and the current highest quality image data, stored in the memory, are for the same person, determining that data for the highest quality second image has a lower quality than the current highest quality image data for the person, and in response to a determination that the data for the highest quality second image has a lower quality than the current highest quality image data for the person: discarding the highest quality image, maintaining the current highest quality image data for the person in the memory, and not searching the biometric data cache using the highest quality image.

In some implementations, the method may include in response to a determination that the biometric data cache does not include data for the person, determining a closest match for the person in the data storage system in response to searching the data storage system based on the detected face of the person. Storing the image data for the person in the biometric data cache may include storing the image data and information about the closest match in the biometric data cache. Storing the image data for the person in the biometric data cache may include determining that the biometric data cache includes image data for a maximum quantity of people, determining particular image data with an older time stamp than the other image data in the biometric data cache, and removing, from the biometric data cache, data for the person represented by the image data with the older time stamp than the other image data. Storing the image data for the person in the biometric data cache may include determining that the biometric data cache includes image data for a maximum quantity of people, determining particular image data in the biometric data cache that was least recently accessed compared to image data in the biometric data cache for the other people in the second group of multiple different people, and removing, from the biometric data cache, the particular image data. The method may include determining image data in the biometric data cache that was accessed more than a predetermined period of time ago, and removing the determined image data from the biometric data cache.

In some implementations, the method may include receiving, for at least one person of interest, image data for the person, storing the received image data in the biometric data cache, and storing, for each person of interest, data flagging the corresponding image data as depicting a person of interest. The method may include receiving a second image, detecting, in the second image, a second face of a second person, searching the biometric data cache based on the detected second face, in response to searching the biometric data cache based on the detected second face, determining that the second person is flagged as a person of interest in the biometric data cache, and discarding the second image to prevent further processing of the second image. The method may include determining that the second person is an employee of a particular entity using data for the person in the biometric data cache in response to determining that the second person is flagged as a person of interest. Discarding the second image to prevent further processing of the second image may include discarding the second image to prevent further processing of the second image in response to a determination that the second person is an employee of the particular entity. The method may include receiving a second image, detecting, in the second image, a second face of a second person, searching the biometric data cache based on the detected second face, in response to searching the biometric data cache based on the detected second face, determining that the second person is flagged as a person of interest in the biometric data cache, and sending an alert message with information about the second person.

The subject matter described in this specification can be implemented in particular embodiments and may result in one or more of the following advantages. In some implementations, the systems and methods described below may use a biometric data cache to reduce processing time of image data, more efficiently track faces that have been blocked or moved out of a field of view of a camera, or both, compared to other systems. In some implementations, the systems and methods described below may reduce the number of match requests sent to a larger database compared to other systems that do not include an image data cache. In some implementations, a multi-camera system may recognize that an individual that has been detected in a frame from a first camera is the same person as an individual detected in a frame from a second camera. In some implementations, a system with one or more caches, e.g. a quick classification system, may more quickly recognize an individual for which one of the caches includes data compared to other systems.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
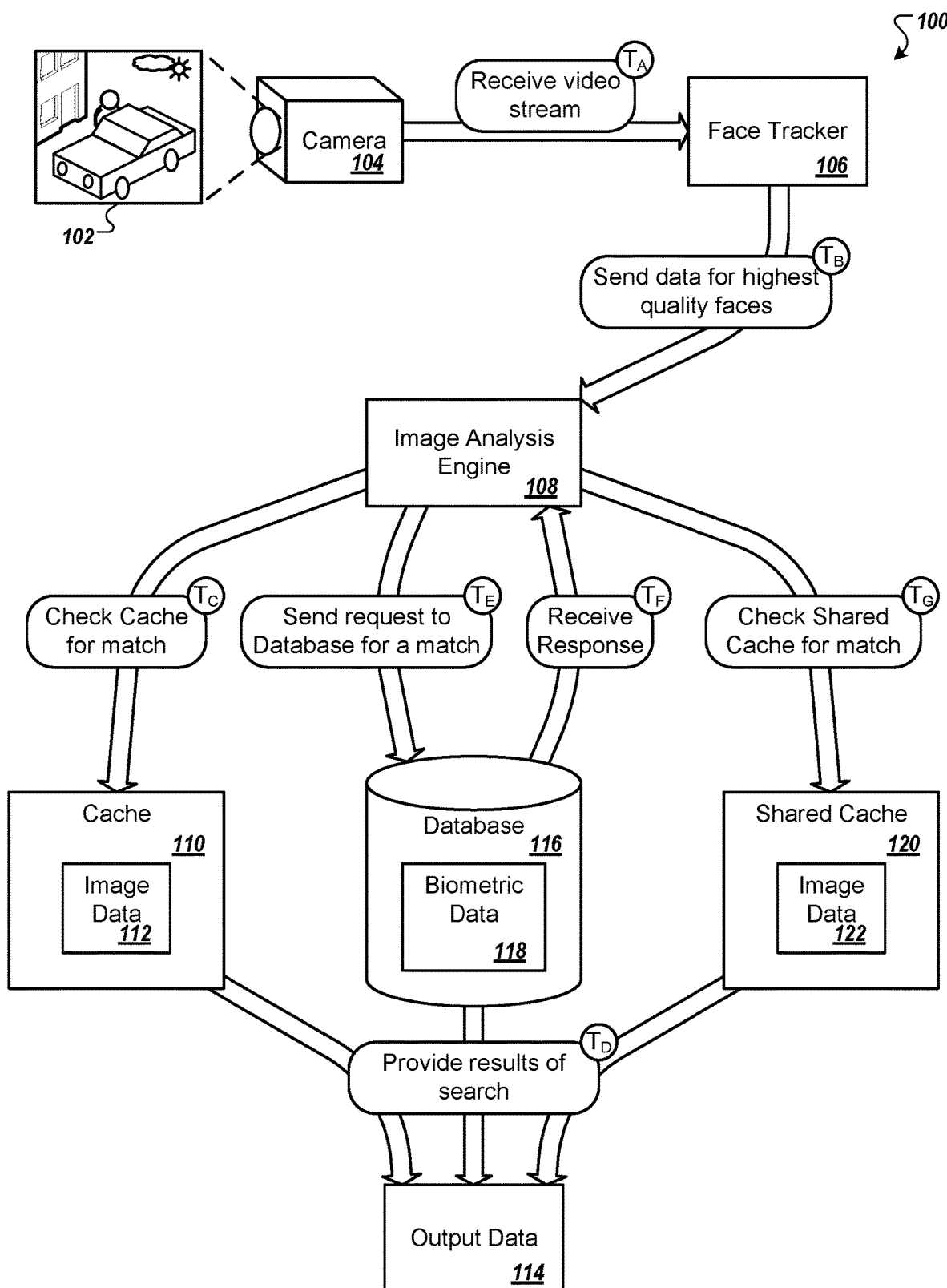
FIG. 1 is an example of an environment in which a face recognition system uses a cache to track a face.

A face recognition system may receive a video stream with twenty-five to thirty frames per second. To reduce a number of comparisons of image data representing faces from the video stream with a database of image data, the face recognition system may analyze only the highest quality image data, e.g., for a predetermined period of time, may compare the image data with image data stored in a cache, or both.

For example, the face recognition system may determine that a particular face is included in each frame for a five second period and select a highest quality face from the frames for that period of time. The highest quality face may have a highest quality image data for the particular face, a best angle of the particular face, e.g., when the face is shown from the front and not a perspective view, the best lighting compared to the other depictions of the face, features that most align with reference images in the database, a highest confidence level that the face is actually a face, a highest confidence level that features of the face may be compared to features of other faces, e.g., to determine an identifier for the face, or a combination of two or more of these.

The face recognition system compares the highest quality face, or data representing the highest quality face, with data stored in a cache of image data to determine whether the particular face matches a face represented by the image data in the cache. If the face recognition system determines that the cache includes a match, the face recognition system may use data from the cache for the match to perform an action. For instance, the face recognition system may reassign an identifier to the particular face that was previously assigned to the particular face, e.g., determine that the face was temporarily out of the view of a camera included in the face recognition system, or notify another system about the depiction of the particular face in the video stream.

The face recognition system may alert another system or a guard when the face recognition system determines that a face in the video stream is for a person on a watch list. The face recognition system does not need to query the database of image data when the face recognition system identifies a match in the cache.

If the face recognition system determines that the cache does not include a match, the face recognition system queries the database of image data to determine whether the database includes image data that matches image data for the highest quality face for the particular face. The face recognition system adds an entry to the cache that includes the image data for the highest quality face and, if a match is found in the database, may include data from the database in the entry.

In some examples, the face recognition system may be able to track faces across consecutive frames in a video stream when the face does not turn away, is not blocked by another object, or otherwise does not leave the field of view of a camera capturing a video stream. The face recognition system may use the cache to quickly determine whether a particular face was previously seen. If so, the face recognition system does not send a request to the database. If not, the face recognition system sends a request to a database to determine information about the face.

FIG. 1 is an example of an environment 100 in which a face recognition system uses a cache to track a face. The face recognition system receives a video stream 102 from a camera 104 during time period TA. The video stream includes multiple frames of an area, such as an area outside a building. In some examples, a field of view of the camera 104 may be fixed. In some examples, the camera 104 may move, e.g., rotate, be an aerial camera, or a camera on a mobile device.

For example, a face tracker 106 may receive the video stream from the camera 104. The face tracker 106 analyzes the frames in the video stream to determine whether the frames of the video stream include faces.

For each frame in which a particular face is identified, the face tracker 106 determines a quality of the face. The face tracker 106 may determine the quality of the face for a particular frame using an angle of the face, e.g., a frame with a perspective view of a face or the back of a person's head would have a lower quality score than a frame that shows all of a face. The face tracker 106 may determine the quality of the face for a particular frame using a blur of the particular frame, e.g., a blur of the face in the particular frame, a lighting of the face in the particular frame, a quantity of shadows on the face in the particular frame, or any other appropriate features of the face, the particular frame, or both. The face tracker 106 may determine a quality of the face using a determination of whether an object has eyes, a distance between the eyes, a confidence level that the eyes are actually eyes and not other objects, a confidence level that the face is actually a face and not another object, or a combination of two or more of these.

In some examples, the face tracker 106 may determine a score that represents a combination of two or more of the features above and use the score to determine whether a face is detected in a frame. The face tracker 106 may apply a sigmoid function to the score and use the output of the sigmoid function to determine whether a face is detected in a frame. For instance, when the face tracker 106 determines that the score or the output of the sigmoid function satisfies a threshold value, e.g., is greater than the threshold value, the face tracker 106 may determine that the frame includes an image of a face.

The face tracker 106, at time TB, sends data for a highest quality faces to an image analysis engine 108. For instance, when the face tracker 106 identifies a new face or a face not associated with a face from a previous frame, e.g., the face turned out of a field of view of the camera 104 or the person left the field of view and then returned, the face tracker 106 analyzes frames for a predetermined time interval, e.g., five seconds, to determine the highest quality face and sends data for the highest quality face to the image analysis engine 108. The data for the highest quality face may include data that identifies the face, e.g., an identifier for the face, quality information for the face, details about the face such as hair color or gender, a link to an image of the face, e.g., cropped from the frame in which the face was detected, or a combination of two or more of these.

The image analysis engine 108 determines an identifier for the highest quality face, quality information for the face, or both. For instance, the image analysis engine 108 assigns a quality score, e.g., between one and one hundred or between zero and one, to the highest quality face using properties of the highest quality face. The image analysis engine 108 may use the score computed by the face tracker 106 for the highest quality face. The image analysis engine 108 may compute a score for the highest quality face using one or more of the features described above, e.g., confidence level that an object is a face, confidence level that the object has eyes, distance between the eyes, or two or more of these.

The image analysis engine 108 may determine whether an identifier was previously assigned to the face or an identifier should be assigned to the face. For instance, the image analysis engine 108 or the face tracker 106 may assign an identifier to a face to use when transmitting image data for the face to other components in the face recognition system. When the face tracker 106 determines that a face has not been assigned an identifier, the face tracker 106 assigns an identifier to the face and sends the identifier to the image analysis engine 108 with the highest quality face from a predetermined time interval.

The face tracker 106 continues to send highest quality faces to the image analysis engine 108 for each predetermined time interval, e.g., during time period TB. For example, the face tracker 106 may detect three highest quality faces for a particular face from different time intervals. The face tracker 106 sends the first of the highest quality faces to the image analysis engine 108. When the face tracker 106 detects a second of the highest quality faces, the face tracker 106 may determine that the second of the highest quality faces has a higher quality than a first of the highest quality faces and send image data for the second of the highest quality faces to the image analysis engine 108. When the face tracker 106 detects a third of the highest quality faces, the face tracker 106 may determine that the second of the highest quality faces has a higher quality than the third of the highest quality faces, using the corresponding quality scores or analysis of image data for the faces, and discard data for the third of the highest quality faces, e.g., and not send image data for the third of the highest quality faces to the image analysis engine 108.

The image analysis engine 108 uses the image data for the highest quality face to determine, at time $T_C$, whether a cache 110 has image data 112 for the highest quality face. The image analysis engine 108 may determine, for each of the highest quality faces, a quality score and stores, in the cache 110, only data for a particular highest quality face from all the highest quality faces. For instance, the image analysis engine 108 may receive only the highest quality face from all the highest quality faces from the face tracker 106. In some examples, the image analysis engine 108 may receive multiple highest quality faces for a particular face from the face tracker 106, e.g., the face tracker 106 may send the image analysis engine 108 two highest quality faces when the particular face moves outside a field of view of a camera for a predetermined period of time.

The image analysis engine 108 compares data for the highest quality face received from the face tracker 106 with data for the particular face in the image data 112. If a quality score for the highest quality face is greater than a quality score for the data in the image data 112 for the particular face, the image analysis engine 108 stores the data for the highest quality face in the image data 112, e.g., and discards the old data for the particular face from the image data 112. If the quality score for the highest quality face is less than the quality score for the data in the image data 112 for the particular face, the image analysis engine 108 discards the data for the highest quality face. If the two quality scores are the same, the image analysis engine 108 may discard the data for the highest quality face or store the data for the highest quality face in the image data 112, e.g., and discard the old data for the particular face from the image data 112.

The image analysis engine 108 may use any appropriate method to determine whether the cache 110 includes data in the image data 112 for the highest quality face. For instance, the image analysis engine 108 may compare the highest quality face, or features of the highest quality face, with a reference image and use the result of the comparison as an index for the image data 112. The image analysis engine 108 may determine whether the image data 112 includes data at the indexed location or may determine a closest location in the image data 112 to the indexed location and use that data for the highest quality face. When the image analysis engine 108 determines that there is not data at the indexed location or that the closest location in the image data 112 is not a match for the face depicted in the highest quality face, the image analysis engine 108 determines that the image data 112 does not include data for the face depicted in the highest quality face.

When the image analysis engine 108 determines that the cache 110 includes data for the highest quality face, the image analysis engine 108 may use data from the image data 112 or other data in the cache 110, at time TD, to perform an action. For instance, the image analysis engine 108 may send a notification about the face to a device, e.g., indicating that a person is in an area around the camera 104. When the image analysis engine 108 identifies the face of a person who is on a persons of interest list, the image analysis engine 108 may determine a particular person or a particular system to notify and send the notification to that particular person, particular system, or both.

In some examples, the image analysis engine 108 performs no action. For example, the image analysis engine 108 may determine that the person is an employee and is authorized to be in a physical area near the camera 104.

The image analysis engine 108, at time TD, may provide output data 114 to another system or a device. The output data may include the highest quality face, the identifier for the face, or other data associated with the face. For instance, when the image analysis engine 108 determines that the cache 110 includes data for the highest quality face, the image analysis engine 108 may determine an identifier for the face and provide the identifier to the face tracker 106. The face tracker 106 may use the identifier to track the face, e.g., and replace a current identifier with the identifier received from the image analysis engine 108.

The image analysis engine 108 may provide the face tracker 106 with quality information. For instance, the face tracker 106 may use the quality information to determine whether a new highest quality face has been identified for the particular face and whether the new highest quality face, or data representing the new highest quality face, should be sent to the image analysis engine 108 for storage in the cache 110.

When the image analysis engine 108 determines that the cache 110 does not include data for the highest quality face, the image analysis engine 108 sends, at time $T_E$, a request to a database 116 for a match. The database 116 may be part of the same system as the image analysis engine 108 or part of another system.

The database 116 uses image data for the highest quality face to search biometric data 118 to determine whether the database includes a match for the face. The database 116 may use any appropriate method to search the biometric data 118 using the highest quality face or image data for the highest quality face, such as the method described above used by the image analysis engine 108 to search the cache 110 and the image data 112.

The image analysis engine 108, at time $T_F$, receives a response from the database 116 indicating whether or not the biometric data 118 includes a match for the highest quality face. When the biometric data 118 includes a match, the image analysis engine 108 may receive a response that includes data about the highest quality face, e.g., the corresponding person's name, whether the person is on a watch list or a persons of interest list, etc. When the biometric data 118 does not include a match, the image analysis engine 108 may receive a response that indicates that a match was not found.

The image analysis engine 108 updates the cache 110, and the image data 112, with data about the highest quality face. For example, when the image analysis engine 108 determines that the cache 110 does not include data for the highest quality face, the image analysis engine 108 stores data representing the highest quality face in the cache 110, e.g., whether or not the database 116 includes data for the highest quality face.

The image analysis engine 108 may store particular image data for the highest quality face in the image data 112 and the identifier for the face in the cache 110. The image analysis engine 108 may use any appropriate method to determine how to store the particular image data in the image data 112, e.g., how to index the particular image data.

The image analysis engine 108 stores particular image data for the highest quality face in the image data 112, whether or not the database 116 includes a match for the highest quality face, so that later queries with image data for the face are compared to the most recent image data for the face, e.g., assuming the image data for the face has not been removed from the image data 112 based on a memory management algorithm. For instance, the image data in the biometric data 118 is likely older than data stored in the image data 112, e.g., image data from the biometric data 118 likely does not include the environment in which the person is depicted, and the face recognition system uses the image data in the cache 110 as the face recognition system may more easily determine a match using more recent image data in the cache 110 compared to the older data from the biometric data 118.

The cache 110 is smaller than the database 116 in that the cache stores data for fewer faces or people. Similarly, the image data 112 is smaller than, and stores data for fewer faces or people than, the biometric data 118. The face recognition system searches the cache 110, and the image data 112 in the cache 110, first to reduce processing time for persons that have been recently seen in the same video stream from the camera 104, for persons on a person of interest list, or both, e.g., compared to the longer amount of time which may be necessary to search the database 116 and the biometric data 118 for a match.

In some implementations, the image analysis engine 108 may search a shared cache 120 for a match at time TG. For instance, the image analysis engine 108 may determine that the cache 110 does not include data for a highest quality face and search the shared cache 120, and shared image data 122 in the shared cache 120, for a match, e.g., similar to the process used to search the cache 110 for a match. The shared cache 120 is a cache in which image data is stored for the camera 104, another camera monitoring a physical area near the physical area near the camera 104, or both. For instance, the shared cache 120 may include image data for faces recently depicted in a video stream captured by the other camera.

In some examples, the shared cache 120 may include image data for multiple other cameras. For instance, the shared cache may include image data from the cache 110 and from other caches for cameras in physical areas near the physical area of the camera 104.

The physical areas near the physical area of the camera 104 may include an area in which a person may walk to move from a field of view of the camera 104 to a field of view of another camera in a short period of time. For instance, two cameras may be on opposite sides of a wall, near in physical proximity, and not share a cache because of the amount of time or the physical distance a person would have to walk to move from the field of view of one of the two cameras to a field of view of the other camera.

In some implementations, when the image analysis engine 108 receives a new highest quality face, e.g., when the image analysis engine 108 previously sent image data for the face to the image analysis engine 108, the image analysis engine 108 may provide image data for the new highest quality face to the image analysis engine 108. The image analysis engine 108 stores the image data in the cache 110. The image analysis engine 108 may replace image date for the old highest quality face with the new image data. In some examples, the image analysis engine 108 may store the new image data with the old image data for the face in the cache 110.

A network, such as a local area network (LAN), wide area network (WAN), the Internet, or a combination thereof, may connect the camera 104, the cache 110, the database 116, and any other hardware, e.g., that includes the face tracker 106, and the image analysis engine 108. For instance, one or more computers may include the face tracker 106 and the image analysis engine 108 and may receive the video stream from the camera 104 using the network.

Figure 2A:
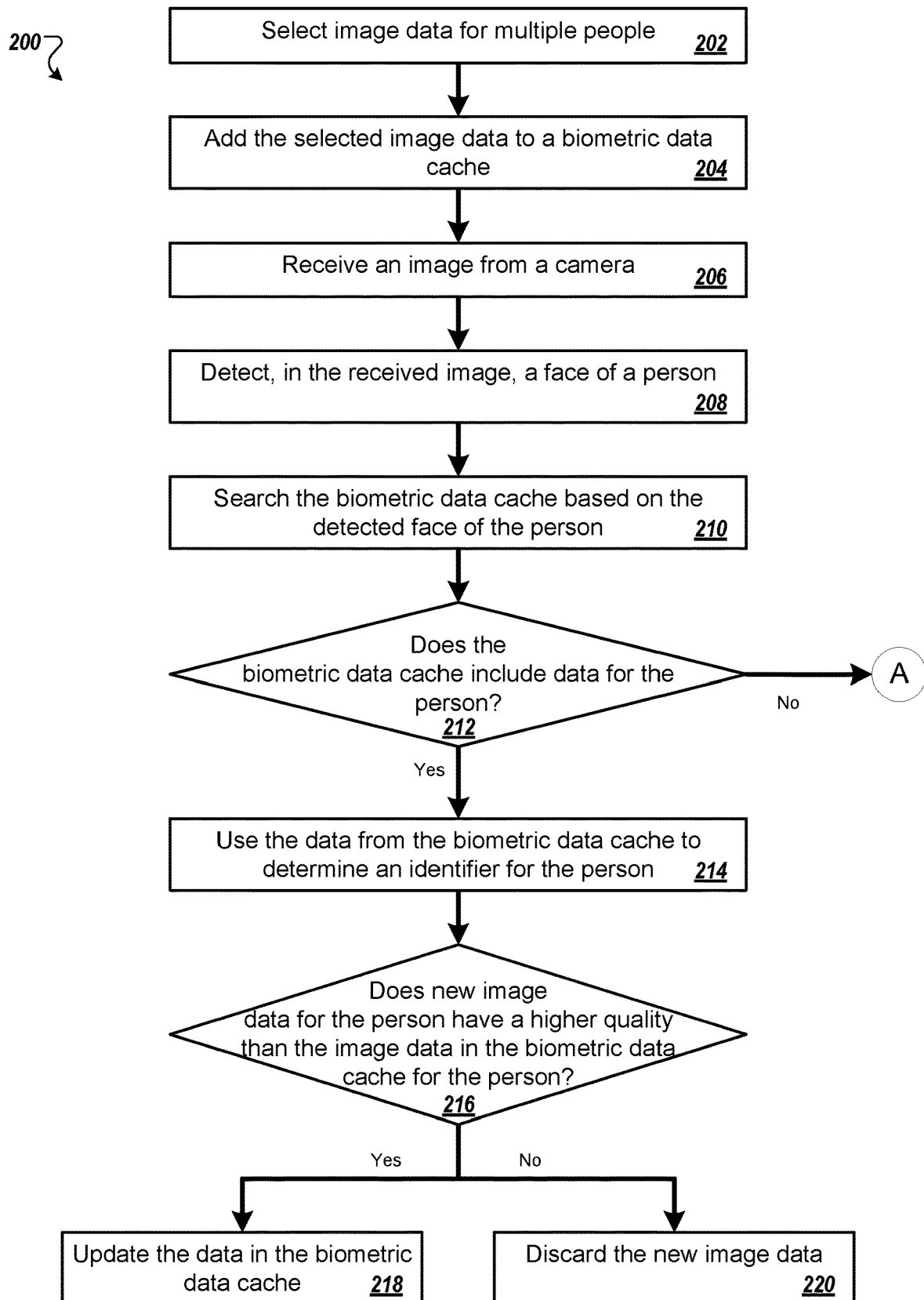
FIGS. 2A-B are a flow diagram of a process for determining whether a biometric data cache includes data for a person.
Figure 2B:
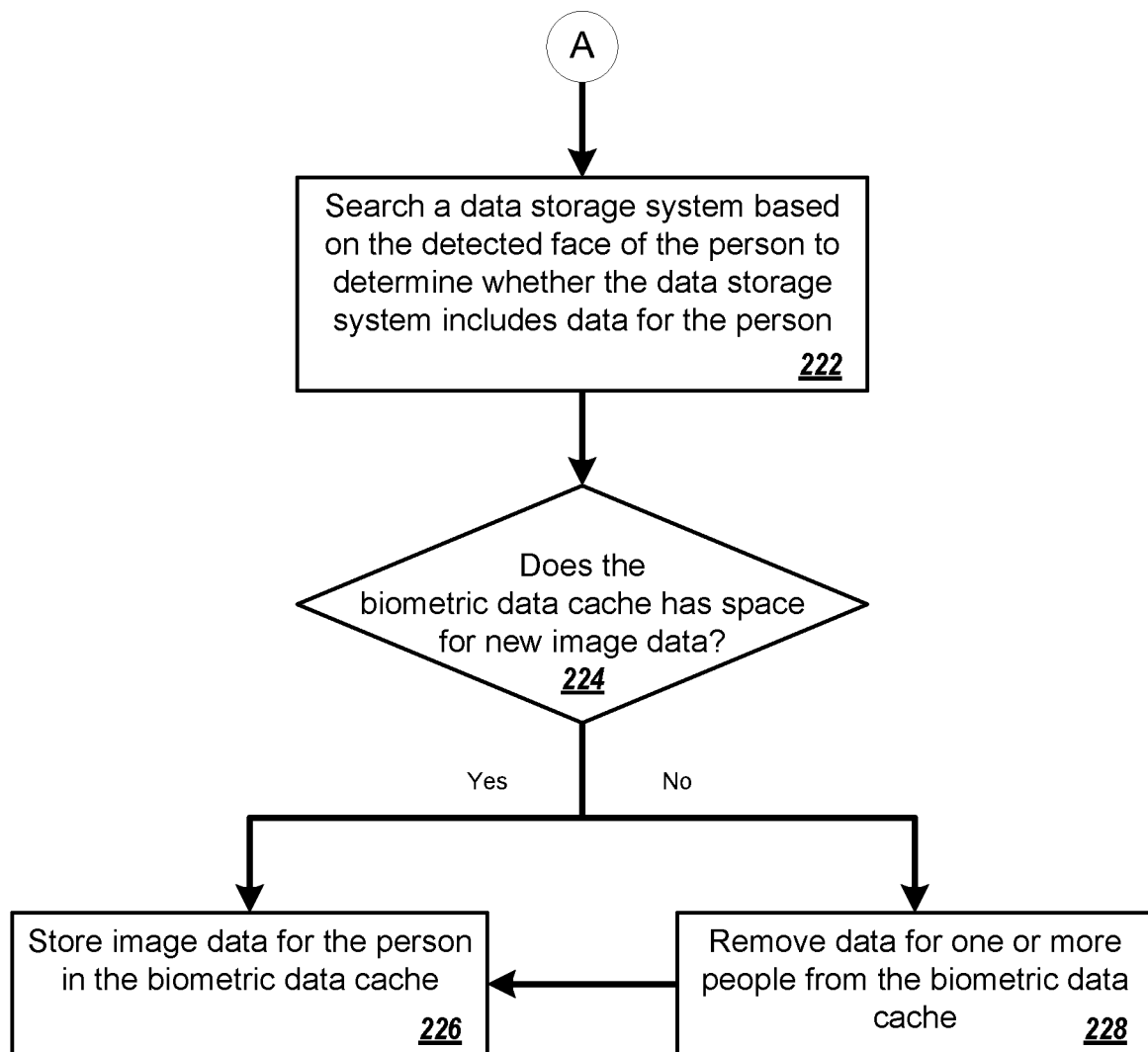

FIGS. 2A-B are a flow diagram of a process 200 for determining whether a biometric data cache includes data for a person. For example, the process 200 can be used by the face recognition system from the environment 100.

The face recognition system selects image data for multiple people (202), as shown in FIG. 2A. For example, the face recognition system determines people who are on a watch list, a person of interest, an employee of a particular entity, or another type of person who is likely to be in a field of view of a particular camera. For instance, the particular entity may own a building and the camera may be at the building. The face recognition system may receive a list of the particular entity's employees and image data for those employees.

The face recognition system adds the selected image data to a biometric data cache (204). For example, the face recognition system determines that the employees are likely to be in the field of view of the camera one or more times each day, e.g., during the week, and adds image data for the employees to the biometric data cache.

The face recognition system may use a time of day, a day of week, date, holiday information, or other information to select the image data for the multiple people and add the image data to the biometric data cache. In some examples, the face recognition system may use first image data for employees who work during the week and add the first image data to the biometric data cache during weekdays. The face recognition system may use second image data for employees who work on weekends and add the second image data to the biometric data cache on weekends, e.g., and remove the first image data from the biometric data cache during the weekends.

The face recognition system receives an image from a camera (206). For instance, the face recognition system receives a video stream of frames from the camera. The image may be one of the frames from the video stream.

The face recognition system detects a face of a person in the received image (208). For example, the face recognition system may determine whether a face or multiple faces are shown in each of the frames. When the face recognition system detects at least one face in a frame, the face recognition system may track that face across multiple frames for a predetermined time interval, e.g., five seconds. The face recognition system may select a highest quality face from a frame in the predetermined time interval and for a particular face, and use the highest quality face as representative of the particular face of the person. The face recognition system may perform this process for each face detected in the video stream, e.g., may perform some of the steps of the process 200 for each detected face.

The face recognition system searches the biometric data cache based on the detected face of the person (210). The face recognition system may use the image data for the detected face, properties of the face from the image data, or both, to search the biometric data cache. The face recognition system may use any appropriate method to search the biometric data cache for a match of the face.

The face recognition system determines whether the biometric data cache includes data for the person (212). For example, the face recognition system determines whether the biometric data cache includes a match for the person or a closest match that is within a threshold likelihood of being the person.

In response to determining that the biometric data cache includes data for the person, the face recognition system uses the data from the biometric data cache to determine an identifier for the person (214). The identifier may be a numerical identifier, a string, or any other appropriate value. In some examples, the identifier may include a name of the person, when the name is available.

The face recognition system determines whether new image data for the person has a higher quality than the image data in the biometric data cache for the person (216). For instance, the face recognition system uses quality information for the new image data and the image data in the biometric data cache to determine which image data better represents the face of the person, is better for comparison with other facial image data of the person, or both. In some examples, the face recognition system periodically uses a new highest quality image from the camera to determine whether the new highest quality image from the camera has a higher quality or is better for facial analysis purposes than image data previous stored in the biometric data cache.

In response to determining that the new image data for the person has a higher quality than the image data in the biometric data cache for the person, the face recognition system updates the data in the biometric data cache (218). For example, the face recognition system stores the new image data in the biometric data cache and associates the new image data with the identifier for the person. The face recognition system may remove any association of the person with image data previously stored in the biometric data cache, e.g., by deleting the previously stored image data.

In response to determining that the new image data for the person does not have a higher quality than the image data in the biometric data cache for the person, the face recognition system discards the new image data (220). For instance, the face recognition system does not store the new image data in the biometric data cache.

As shown in FIG. 2B, in response to determining that the biometric data cache does not include data for the person, the face recognition system searches a data storage system based on the detected face of the person to determine whether the data storage system includes data for the person (222). The face recognition system may send the image data for the detected face to the data storage system to cause the data storage system to search a database for a match or a closest match of the face. The database in the data storage system is larger than the biometric data cache, e.g., includes image data for more people than the biometric data cache.

The face recognition system determines whether the biometric data cache has space for new image data (224). For example, whether or not the data storage system includes data for the person, the face recognition system may store image data for the person in the biometric data cache.

In response to determining that the biometric data cache has space for the new image data, the face recognition system stores image data for the person in the biometric data cache (226). In some examples, when the data storage system has data for the person, the face recognition system may store some or all of the data for the person from the data storage system in the biometric data cache. For instance, the face recognition system may store the name of the person in the biometric data cache.

In response to determining that the biometric data cache does not have space for the new image data, the face recognition system removes data for one or more people from the biometric data cache (228). For instance, the face recognition system may remove an oldest entry from the biometric data cache, e.g., the oldest entry that may be removed when the biometric data cache includes entries that remain in the biometric data cache for a particular time period. For example, the face recognition system may remove the oldest entry that is not an entry for an employee of the particular entity. In some examples, the face recognition system may remove an entry that was least recent accessed, an entry or group of entries that were accessed or stored more than a predetermined period of time ago, or both. In some implementations, the face recognition system does not remove entries for persons of interest, persons on a watch list, or other persons who are likely to be in the field of view of the camera from the biometric data cache.

After the face recognition system removes data from the biometric data cache, the face recognition system stores the new image data in the biometric data cache. For instance, the face recognition system performs step 226.

The order of steps in the process 200 described above is illustrative only, and the determination of whether the biometric data cache includes data for a person can be performed in different orders. For example, the face recognition system may determine whether the biometric data cache has space for the new image data, and store the new image data in the biometric data cache, e.g., perform steps 224 and 226 or steps 224 and 228, before searching the data storage system.

In some implementations, the process 200 can include additional steps, fewer steps, or some of the steps can be divided into multiple steps. For example, the face recognition system may perform steps 204 through 228 or steps 204 through 214.

In some implementations, the face recognition system may remove data from a biometric data cache periodically, e.g., according to a schedule. For example, the face recognition system may periodically remove data from the biometric data cache based on an amount of time the data has been stored in the biometric data cache, if the corresponding face has not been depicted in a video stream for a predetermined period of time, or another appropriate pruning technique. The face recognition system may maintain data for particular individuals in the biometric data cache that have at least a threshold likelihood of being within a field of view of a camera, e.g., persons of interest or persons on a watch list.

The face recognition system may have a schedule, e.g., every hour, two hours, twice daily, etc., according to which the face recognition system removes data from the biometric data cache. For instance, the face recognition system may determine, at the scheduled time, whether data for a particular face has been accessed within a predetermined period of time or when the data was stored in the biometric data cache. For all data that has not been accessed within the predetermined period of time, was stored in the biometric data cache more than a threshold amount of time ago, or both, the face recognition system can remove that data from the biometric data cache, e.g., to enable faster processing for the biometric data cache.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 3:
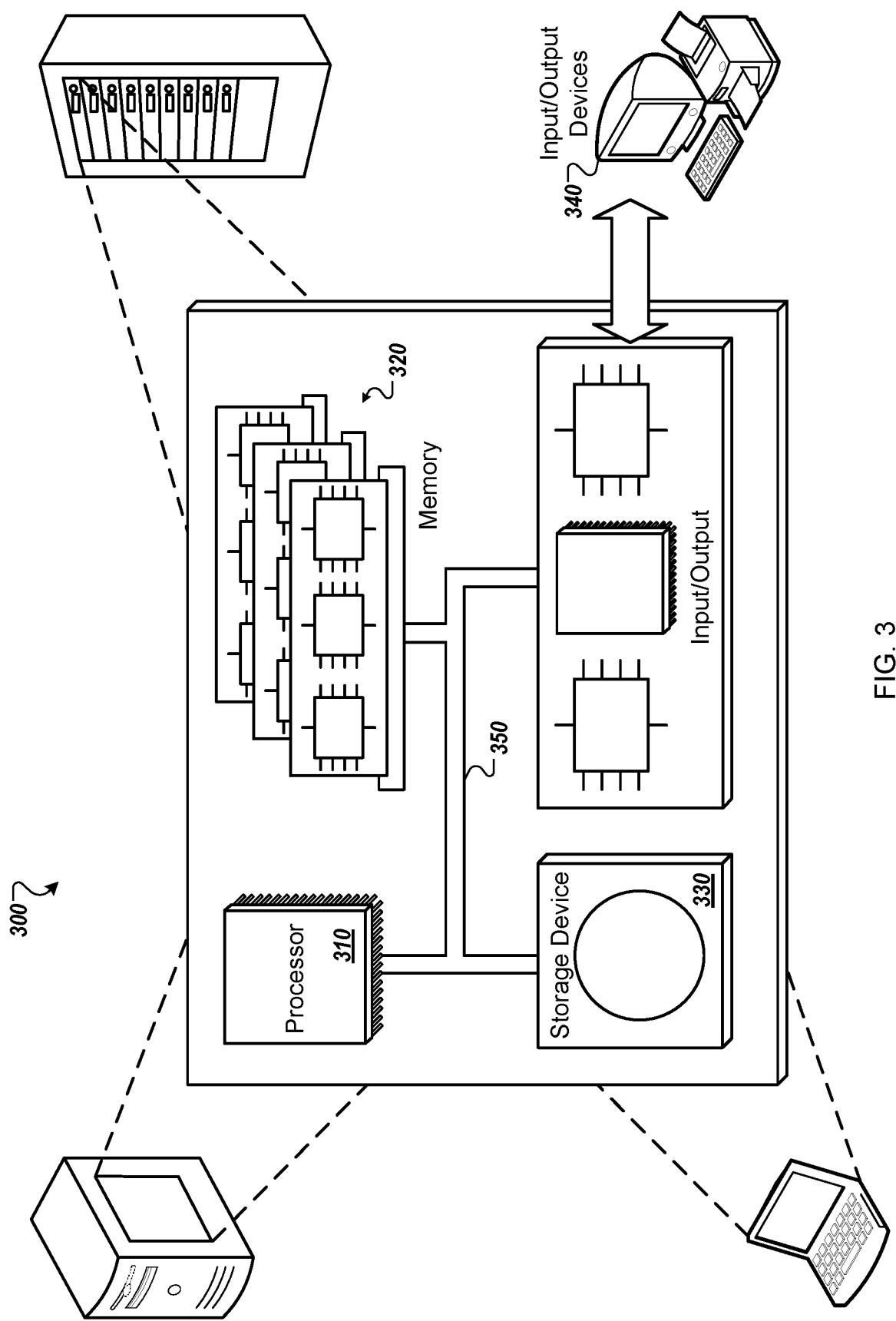
FIG. 3 is a block diagram of a computing system that can be used in connection with computer-implemented methods described in this document.

An example of one such type of computer is shown in FIG. 3, which shows a schematic diagram of a generic computer system 300. The system 300 can be used for the operations described in association with any of the computer-implemented methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
   a first camera;
   a first data processing apparatus for the first camera that is in communication with the first camera;
   a first cache for the first camera that i) is configured to maintain, for a first group of multiple different people, image data for each person in the first group, each person in the first group having at least a threshold likelihood of being within a field of view of the first camera, and ii) is in communication with the first data processing apparatus; and
   a non-transitory computer readable storage medium in data communication with the first data processing apparatus and storing instructions executable by the first data processing apparatus and upon such execution cause the first data processing apparatus to perform operations comprising:
      receiving an image from the first camera;
      detecting, in the image, a face of a person;
      in response to detecting the face of the person, determining, using data for the image, whether the first cache includes data for the person by searching the first cache;
      determining that the first cache does not include data for the person;
      in response to determining that the first cache does not include data for the person, sending, to a second data processing apparatus in communication with a second camera that is a different camera than the first camera, a request for data that indicates whether a second cache for the second camera includes data for the person,
         wherein the second cache for the second camera a) is a separate cache from the first cache, b) is configured to maintain, for a second group of multiple different people, image data for each person in the second group, each person in the second group having at least a threshold likelihood of being within a field of view of the second camera, and c) is in communication with the second data processing apparatus;
      in response to sending the request for data indicating whether the second cache for the second camera includes data for the person, receiving, from the second data processing apparatus when the second data processing apparatus determines that the second cache for the second camera includes the data for the person, a message that includes data for the person; and
      in response to receiving the message that includes data for the person, storing at least some of the data for the person in a first cache for the first camera that is a different cache than the second cache for the second camera.

2. The system of claim 1, comprising the second camera and the second cache.

3. The system of claim 2, comprising a plurality of second cameras that includes the second camera, the operations comprising:
   determining that a field of view for the first camera captures data for a first physical area closer to a second physical area included in a field of view for the second camera compared to other cameras in the plurality of second cameras, wherein sending, to the second data processing apparatus, the request for data indicating whether the second cache for the second camera includes data for the person is responsive to determining that a field of view for the first camera captures data for the first physical area closer to the second physical area included in a field of view for the second camera compared to other cameras in the plurality of second cameras.

4. The system of claim 1, wherein the second cache is a shared cache configured to maintain, for the second group of multiple different people, image data for each person in the second group, each person in the second group having at least a threshold likelihood of being within a field of view of the second camera or within a field of view of a third camera that is a different camera than the first camera and the second camera.

5. The system of claim 1, the operations comprising, for a second image that is different from the image:
receiving the second image from the first camera,
detecting, in the second image, another face of another person;
sending, to the second data processing apparatus, a second request for data indicating whether the second cache for the second camera includes data for the other person;
in response to sending the request for data indicating whether the second cache for the second camera includes data for the other person, receiving, from the second data processing apparatus, a second message that indicates that the second cache does not include data for the other person; and
in response to receiving the second message that indicates that the second cache does not include data for the other person, searching, using data for the second image, a data storage system to determine whether the data storage system includes data for the other person, the data storage system configured to maintain, for a third group of multiple different people, biometric data for each of the multiple different people in the third group, the third group of multiple different people including more people than a) the second group of multiple different people for which the second cache maintains data and b) the first group of multiple different people for which the first cache maintains data.

6. The system of claim 5, comprising the data storage system.

7. A non-transitory computer readable storage medium storing instructions executable by a data processing apparatus and upon such execution cause the data processing apparatus to perform operations comprising:
receiving an image from a first camera that is in communication with the data processing apparatus, wherein the data processing apparatus is for the first camera and in communication with a first cache for the first camera that is configured to maintain, for a first group of multiple different people, image data for each person in the first group, each person in the first group having at least a threshold likelihood of being within a field of view of the first camera;
detecting, in the image, a face of a person;
in response to detecting the face of the person, determining, using data for the image, whether the first cache includes data for the person by searching the first cache;

determining that the first cache does not include data for the person;
in response to determining that the first cache does not include data for the person, sending, to a second data processing apparatus in communication with a second camera that is a different camera than the first camera, a request for data that indicates whether a second cache for the second camera includes data for the person, wherein the second cache for the second camera a) is a separate cache from the first cache, b) is configured to maintain, for a second group of multiple different people, image data for each person in the second group, each person in the second group having at least a threshold likelihood of being within a field of view of the second camera, and c) is in communication with the second data processing apparatus;
in response to sending the request for data indicating whether the second cache for the second camera includes data for the person, receiving, from the second data processing apparatus when the second data processing apparatus determines that the second cache for the second camera includes the data for the person, a message that includes data for the person; and
in response to receiving the message that includes data for the person, storing at least some of the data for the person in a first cache for the first camera that is a different cache than the second cache for the second camera.

8. The computer readable storage medium of claim 7, the operations comprising:
determining that a field of view for the first camera captures data for a first physical area closer to a second physical area included in a field of view for the second camera compared to other cameras in a plurality of second cameras that includes the second camera,
wherein sending, to the second data processing apparatus, the request for data indicating whether the second cache for the second camera includes data for the person is responsive to determining that a field of view for the first camera captures data for the first physical area closer to the second physical area included in a field of view for the second camera compared to other cameras in the plurality of second cameras.

9. The computer readable storage medium of claim 7, wherein the second cache is a shared cache configured to maintain, for the second group of multiple different people, image data for each person in the second group, each person in the second group having at least a threshold likelihood of being within a field of view of the second camera or within a field of view of a third camera that is a different camera than the first camera and the second camera.

10. The computer readable storage medium of claim 7, the operations comprising:
receiving, from a data storage system, second data for at least one person in the first group of multiple different people, the data storage system configured to maintain, for a third group of multiple different people, biometric data for each of the multiple different people in the third group, the third group of multiple different people including more people than a) the second group of multiple different people for which the second cache maintains data and b) the first group of multiple different people for which the first cache maintains data; and
storing, in the first cache, the second data for the at least one person in the first group of multiple different people.

11. The computer readable storage medium of claim 7, the operations comprising, for a second image that is different from the image:
receiving the second image from the first camera,
detecting, in the second image, another face of another person;
sending, to the second data processing apparatus, a second request for data indicating whether the second cache for the second camera includes data for the other person;
in response to sending the request for data indicating whether the second cache for the second camera includes data for the other person, receiving, from the second data processing apparatus, a second message that indicates that the second cache does not include data for the other person; and
in response to receiving the second message that indicates that the second cache does not include data for the other person, searching, using data for the second image, a data storage system to determine whether the data storage system includes data for the other person, the data storage system configured to maintain, for a third group of multiple different people, biometric data for each of the multiple different people in the third group, the third group of multiple different people including more people than a) the second group of multiple different people for which the second cache maintains data and b) the first group of multiple different people for which the first cache maintains data.

12. The computer readable storage medium of claim 11, the operations comprising:
in response to determining that the data storage system includes data for the other person, receiving, from the data storage system, second data for the other person; and
storing, in the first cache, the second data for the other person.

13. A computer-implemented method comprising:
receiving, by a system, an image from a first camera that is in communication with the system, wherein the system is for the first camera and in communication with a first cache for the first camera that is configured to maintain, for a first group of multiple different people, image data for each person in the first group, each person in the first group having at least a threshold likelihood of being within a field of view of the first camera;
detecting, in the image, a face of a person;
in response to detecting the face of the person, determining, using data for the image, whether the first cache includes data for the person by searching the first cache;
determining that the first cache does not include data for the person;
in response to determining that the first cache does not include data for the person, sending, to a second system in communication with a second camera that is a different camera than the first camera, a request for data that indicates whether a second cache for the second camera includes data for the person,
wherein the second cache for the second camera a) is a separate cache from the first cache, b) is configured to maintain, for a second group of multiple different people, image data for each person in the second group, each person in the second group having at least a threshold likelihood of being within a field of view of the second camera, and c) is in communication with the second system;
in response to sending the request for data indicating whether the second cache for the second camera includes data for the person, receiving, from the second system when the second system determines that the second cache for the second camera includes the data for the person, a message that includes data for the person; and
in response to receiving the message that includes data for the person, storing at least some of the data for the person in a first cache for the first camera that is a different cache than the second cache for the second camera.

14. The method of claim 13, comprising:
determining that a field of view for the first camera captures data for a first physical area closer to a second physical area included in a field of view for the second camera compared to other cameras in a plurality of second cameras that includes the second camera,
wherein sending, to the second system, the request for data indicating whether the second cache for the second camera includes data for the person is responsive to determining that a field of view for the first camera captures data for the first physical area closer to the second physical area included in a field of view for the second camera compared to other cameras in the plurality of second cameras.

15. The method of claim 13, wherein the second cache is a shared cache configured to maintain, for the second group of multiple different people, image data for each person in the second group, each person in the second group having at least a threshold likelihood of being within a field of view of the second camera or within a field of view of a third camera that is a different camera than the first camera and the second camera.

16. The method of claim 13, comprising:
receiving, from a data storage system, second data for at least one person in the first group of multiple different people, the data storage system configured to maintain, for a third group of multiple different people, biometric data for each of the multiple different people in the third group, the third group of multiple different people including more people than a) the second group of multiple different people for which the second cache maintains data and b) the first group of multiple different people for which the first cache maintains data; and
storing, in the first cache, the second data for the at least one person in the first group of multiple different people.

17. The method of claim 13, comprising, for a second image that is different from the image:
receiving the second image from the first camera,
detecting, in the second image, another face of another person;
sending, to the second system, a second request for data indicating whether the second cache for the second camera includes data for the other person;
in response to sending the request for data indicating whether the second cache for the second camera includes data for the other person, receiving, from the second system, a second message that indicates that the second cache does not include data for the other person; and
in response to receiving the second message that indicates that the second cache does not include data for the other person, searching, using data for the second image, a data storage system to determine whether the data storage system includes data for the other person, the data storage system configured to maintain, for a third group of multiple different people, biometric data for each of the multiple different people in the third group, the third group of multiple different people including more people than a) the second group of multiple different people for which the second cache maintains data and b) the first group of multiple different people for which the first cache maintains data.

18. The method of claim 17, comprising:

in response to determining that the data storage system includes data for the other person, receiving, from the data storage system, second data for the other person; and storing, in the first cache, the second data for the other person.

* * * * *